United States Patent [19]

Schmidt

[11] 4,263,507
[45] Apr. 21, 1981

[54] DUAL MOLECULAR BEAM SYSTEM

[75] Inventor: Thomas W. Schmidt, Bartlesville, Okla.

[73] Assignee: Phillips Petroleum Company, Bartlesville, Okla.

[21] Appl. No.: 7,738

[22] Filed: Jan. 30, 1979

[51] Int. Cl.³ .......................... B01D 59/44; H01J 3/14
[52] U.S. Cl. ................................... 250/281; 250/286; 250/237 R
[58] Field of Search ................... 250/281, 286, 237 R, 250/233, 339, 343

[56] References Cited

U.S. PATENT DOCUMENTS

| 1,816,047 | 7/1931 | Keuffel | 250/233 |
| 3,917,957 | 11/1975 | Ansevin et al. | 250/343 |
| 3,924,124 | 12/1975 | Favre et al. | 250/281 |
| 4,068,122 | 1/1978 | Schmidt et al. | 250/281 |

Primary Examiner—Harold A. Dixon

[57] ABSTRACT

Two converging molecular beams are introduced alternately into the inlet of a mass spectrometer by utilizing a chopping wheel apparatus to alternately pass the two molecular beams to the inlet of the mass spectrometer.

5 Claims, 5 Drawing Figures

DUAL MOLECULAR BEAM SYSTEM

This invention relates to apparatus for introducing two converging molecular beams alternately into the inlet of a mass spectrometer.

In the thermodynamic treatment of liquid solution behavior, deviations from ideality are taken into account by the incorporation of the activity coefficient ($\gamma$) as a correction factor. The deviation of $\gamma$ from unity is greatest for conditions of maximum deviation from ideal behavior. This occurs for a substance when it is infinitely dilute in another component. Hence, the infinite dilution activity coefficient ($\gamma\infty$) is a measure of the maximum nonideal behavior of a substance which is dissolved in another. It is well known that given accurate values for $\gamma\infty$, binary vapor-liquid equilibria can be well characterized over the entire concentration range. This binary vapor-liquid equilibria data can be utilized to calculate vapor liquid and liquid-liquid separation points which must be known to design fractionation or distillation systems.

The term infinitely dilute, as used herein, measn that the solute is sufficiently dilute in the solvent that solute molecules rarely encounter one another but generally are surrounded by only solvent molecules. This generally occurs at solute concentration in the range of about $10^{-3}$ to about $10^{-5}$ mole fraction.

Historically, $\gamma\infty$ values have been determined by extrapolating to zero concentration values of $\gamma$ measured at finite concentrations. The main problem with this method is that as zero concentration is approached, the value for $\gamma$ usually changes by ever increasing amounts. These rapid changes in $\gamma$ make accurate extrapolations nearly impossible.

More recently, a gas liquid chromatography technique has been developed to determine $\gamma\infty$ values. This technique is based on the observation that increased retention times are related to increased nonideal behavior. This method is limited by the relative volatilities of the components and the requirement that one of the components must be in the liquid phase in the chromatographic analyzer column.

It has been found that a mass spectrometer can be utilized to determine $\gamma\infty$ values. When a mass spectrometer is utilized to determine $\gamma\infty$, the vapors from two liquid systems must be columnated into molecular beams. One liquid system is made up of a solvent and a solute while the other liquid system is made up only of solvent. When the two molecular beams are alternately passed to a mass spectrometer, the output from the mass spectrometer will be representative of the difference in partial pressure for any component in the two liquid systems. The output from the mass spectrometer can be utilized to calculate $\gamma\infty$ for the binary liquid system.

U.S. Pat. No. 3,924,124 and U.S. Pat. No. 4,068,122 disclose apparatus for introducing two molecular beams alternately into a mass spectrometer. However, this apparatus cannot be utilized to measure infinite dilution activity coefficients because extremely close temperature control of the two molecular beams is required in determining infinite dilution activity coefficients because the vapor pressures of the liquids vary with temperature. The close temperature control required cannot be achieved using the apparatus of U.S. Pat. No. 3,924,124 or U.S. Pat. No. 4,068,122 because the molecular beams enter the apparatus from opposite sides. It is extremely difficult, if not impossible, to hold the molecular beams, illustrated in FIG. 1 of U.S. Pat. No. 3,924,124 and U.S. Pat. No. 4,068,122, at exactly the same temperature.

It is thus an object of this invention to provide an apparatus for introducing two converging molecular beams alternately into the inlet of a mass spectrometer. Close temperature control of the temperature of the two molecular beams can be achieved because the two molecular beams are close together.

In accordance with the present invention, a chopping wheel apparatus is provided in which a chopping wheel having a plurality of openings therein which are equally angularly spaced with respect to the axis of rotation of the chopping wheel is utilized to alternately pass two molecular beams to the inlet of a mass spectrometer. The sides of the openings in the chopping wheel 41 are substantially parallel. The position of the chopping wheel in the path of the two molecular beams can be adjusted so as to insure that when one molecular beam is blocked the other molecular beam will be passed through an opening in the chopping wheel. The position of the chopping wheel can also be adjusted to vary the relative on/off times of the two molecular beams because of the substantially parallel sides of the openings in the chopping wheel. In this manner, two converging molecular beams may be passed alternately to the inlet of a mass spectrometer and the output of the mass spectrometer may be utilized to calculate infinite dilution activity coefficients.

Other objects and advantages of the invention will be apparent from the foregoing description of the invention and the claims as well as from the detailed description of the drawings in which:

Figure 1:
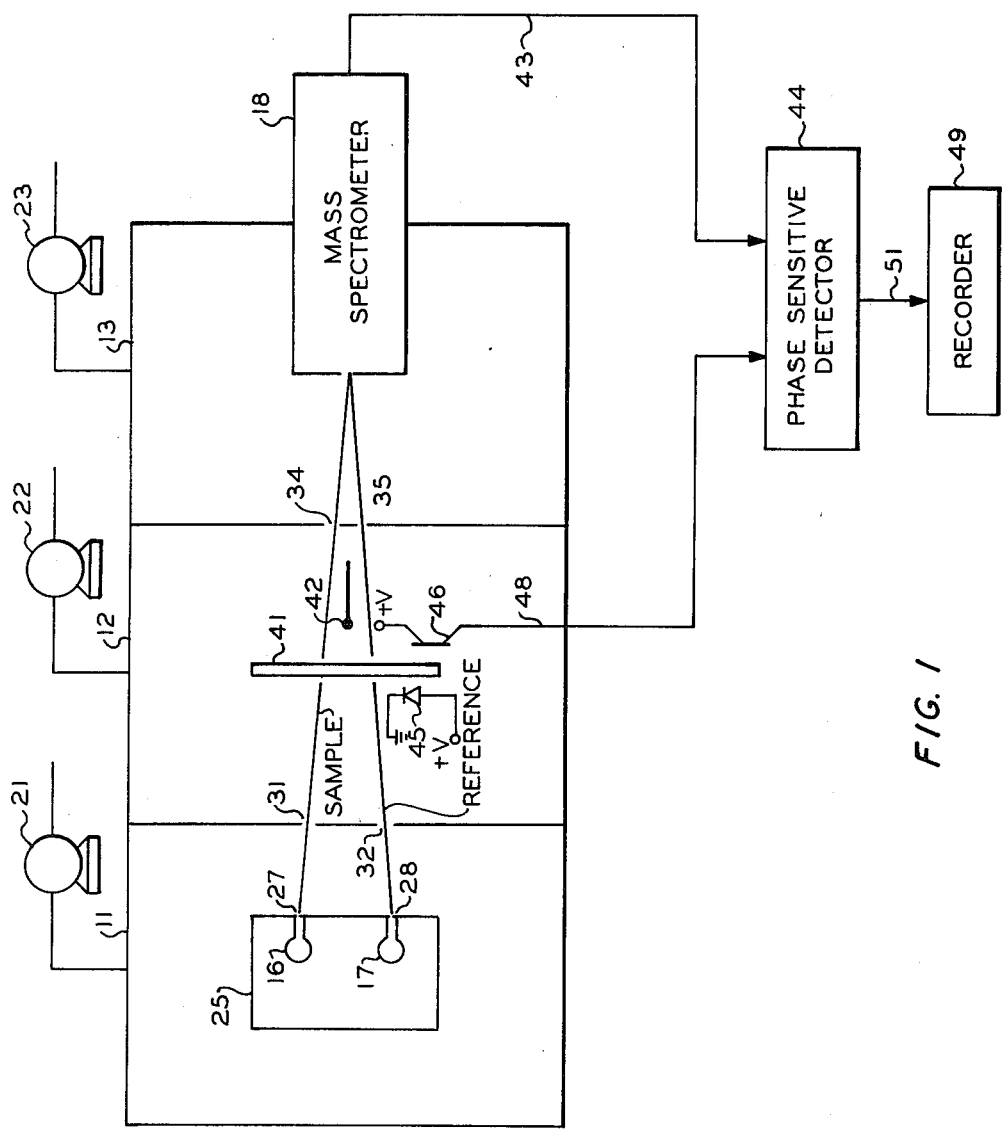
FIG. 1 is a simplified block diagram of a dual molecular beam system.

Referring now to FIG. 1, three chambers 11, 12 and 13 are illustrated. Chamber 11 contains the equilibrium cells 16 and 17. Chamber 12 contains the molecular beam forming system and the molecular beam chopping system. Chamber 13 contains the mass spectrometer 18. The mass spectrometer 18 is preferably a Model 270-9 quadrupole mass spectrometer equipped with an axial ionizer which is manufactured by Extranuclear Corporation, Pittsburgh, Pa.

The oil diffusion pump 21 is utilized to pull a vacuum in chamber 11. The vacuum in chamber 11 is preferably held at approximately $10^{-4}$ torr. The oil diffusion pump 22 is utilized to pull a vacuum in chamber 12. The vacuum in chamber 12 is preferably maintained at approximately $10^{-5}$ torr. The oil diffusion pump 23 is utilized to pull a vacuum in chamber 13. The vacuum in chamber 13 is preferably maintained at approximately $10^{-7}$ torr.

The equilibrium cells 16 and 17 are preferably small chambers in a copper block 25. The equilibrium cells 16 and 17 preferably hold a volume of approximately 6 cc. The vapors from the equilibrium cells 16 and 17 pass out of pinholes 27 and 28. The vapors are columnated into molecular beams by passing through apertures 31 and 32 in the wall between chambers 11 and 12 and also by passing through apertures 34 and 35 in the wall between chambers 13 and 12. The molecular beams originate approximately 12 millimeters apart at the equilibrium cells 16 and 17 and travel in substantially straight lines until the molecular beams converge at the mass spectrometer 18. The movement of the molecular beam from chamber 11 to chamber 13 is caused at least in part by the differential pressures at which chamber 11, 12 and 13 are held.

As has been previously stated, it is extremely important that the temperature of the two molecular beams be maintained equal. To accomplish this, the two equilibrium cells 16 and 17 are formed in a single copper block and a constant temperature liquid is circulated through the copper block 25 and around the equilibrium cells 16 and 17.

A chopping wheel 41 is utilized to break the molecular beams passing from the equilibrium cells 16 and 17 and pass the molecular beams alternately to the mass spectrometer 18. A beam balance filter 42 is also utilized to balance the intensity of the two molecular beams as measured at the mass spectrometer.

The output of the mass spectrometer 18 is provided as one input to the phase sensitive detector 44 which is preferably a Model 393 manufactured by Ithaca Corporation. The combination of the photodiode 45 and the phototransistor 46 is utilized to provide a reference signal to the phase sensitive detector 44. The output signal 48 corresponds to a series of pulses at a frequency corresponding to the frequency at which the molecular beams are alternately transmitted to the mass spectrometer. The output from the phase sensitive detector is provided to the recorder 49 which is preferably a Model 7132A dual channel recorder manufactured by Hewlett packard.

The output signal 43 from the mass spectrometer 18 will be essentially a square wave. The phase sensitive detector 44 amplifies the portion of signal 43 which is in phase with the reference signal 48. The output signal from the phase sensitive detector 44 is thus essentially the integral of the amplified square wave output signal 43 from the mass spectrometer 18.

Either of two equations may be utilized to calculate infinite dilution activity coefficients based on the output signal from the phase sensitive detector 44. These two equations are as follows:

$$\gamma_1^\infty = \frac{p_2^s}{p_1^s} \left[ \frac{\Delta p_1}{\Delta p_2} \right] \quad (I)$$

where $\gamma_1^\infty$ = the infinite dilution activity coefficient of component 1;
$p_1^s$ = the vapor pressure of component 1 at saturation;
$p_2^s$ = the vapor pressure of component 2 at saturation;
$p_1$ = actual vapor pressure of component 1; and
$p_2$ = actual vapor pressure of component 2.

$$\gamma_1^\infty = \frac{p_2^s + \left(\frac{dp}{dx_1}\right)^\infty}{p_1^s} \quad (II)$$

where $\gamma_1^\infty$ = the infinite dilution activity coefficient of component 1;
$p_1^s$ = the vapor pressure of component 1 at saturation;
$p_2^s$ = the vapor pressure of component 2 at saturation;
p = total actual vapor pressure of component 1 and component 2; and
$x_1$ = the mol fraction of component 1 in component 2.

If the dual beam system, illustrated in FIG. 1, is being utilized to calculate $\gamma \infty$ utilizing equation (I) then a pure solution of component 2 is introduced into the equilibrium cells 16 and 17. $\Delta p_1$ will be zero because component 1 will not be present in the equilibrium cells 16 and 17. The beam balance filter 42 is utilized to balance the two molecular beams so that $\Delta p_2$ is zero. A very small amount (approximately $10^{-4}$ mol fraction) of component 1 is then added to the equilibrium chamber 16. $\Delta p_1$ and $\Delta p_2$ will both change from zero. When a measurement is made at the mass of component 1, the output signal 51 from the phase sensitive detector 44 will essentially be equal to $\Delta p_1$. When a measurement is made at the mass of component 2, the output signal 51 from the phase sensitive detector 44 will be essentially equal to $\Delta p_2$. The measured $\Delta p_1$ and $\Delta p_2$ can be utilized in calculating $\gamma \infty$ utilizing equation (I) because both $p_1^s$ and $p_2^s$ are known values.

If equation (II) is being utilized in the pressure-concentration method, then again a substantially pure solution of component 2 is introduced into the equilibrium cells 16 and 17. Again, the beam balance filter 42 is utilized to balance the two molecular beams. A small measured amount (approximately $10^{-4}$ mol fraction) of component 1 is then introduced into the equilibrium cell 16. The combination of the output signal 51 from the phase sensitive detector 44 when a measurement is made at the mass of component 1 and the output signal 51 from the phase sensitive detector 44 when a measurement is made at the mass of component 2 will be representative of the difference in the pressure of the two molecular beams after component 1 is introduced into the equilibrium cell 16. Thus, the combined output signals from the phase sensitive detector 44 are representative of the $dP \infty$ term of equation (II). Both $p_1^s$ and $p_2^s$ are known. $dx_1$ will be known because the amount of component 1 introduced into the equilibrium cell 16 will be known. Thus, the combined output signals from the phase sensitive detector 44 can be utilized to calculate $\gamma \infty$ utilizing equation (II).

Figure 2:
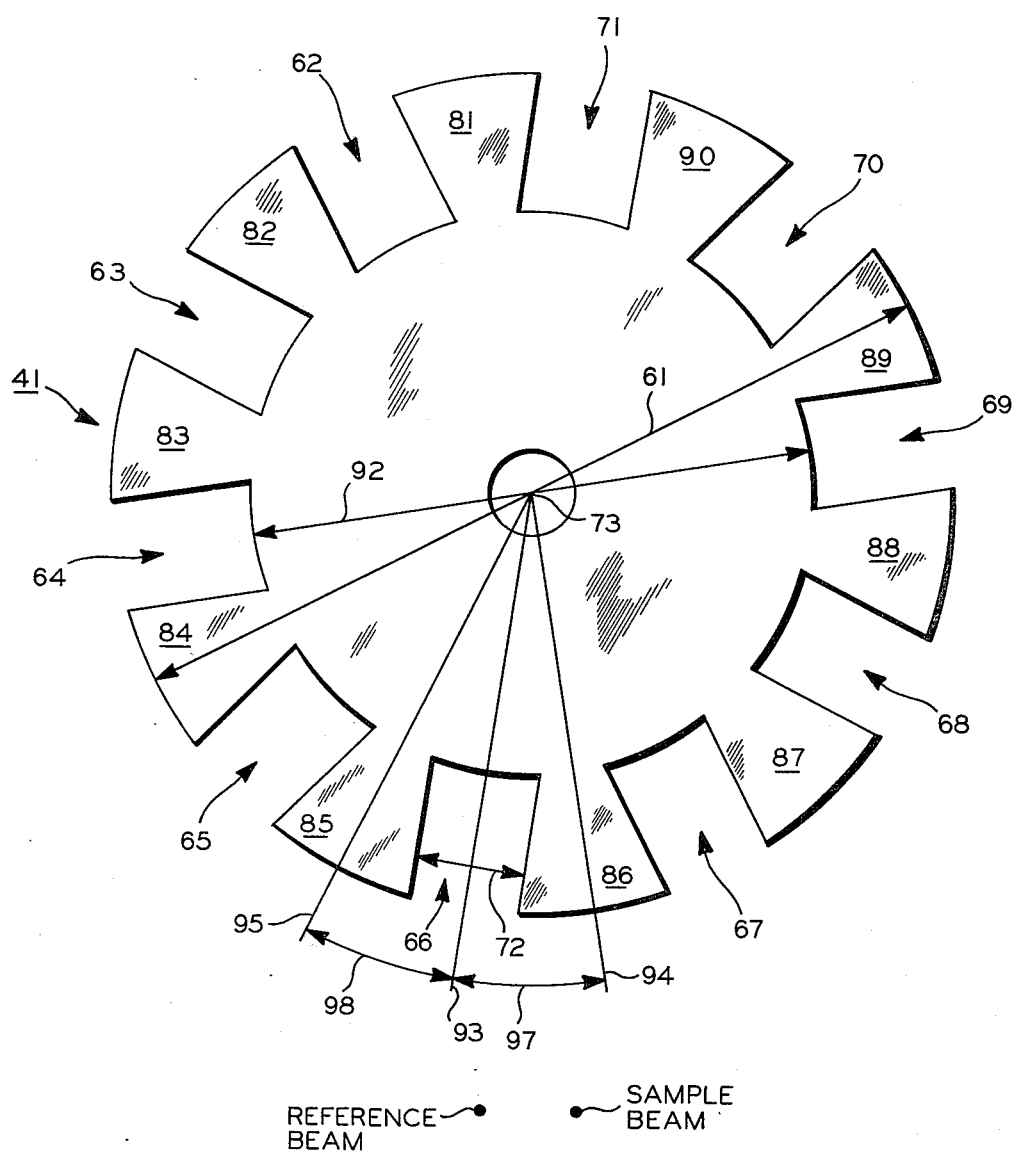
FIG. 2 is an illustration of the chopping wheel illustrated in FIG. 1.

The chopping wheel 41 which is illustrated in FIG. 1 is more fully illustrated in FIG. 2. Referring now to FIG. 2, the chopping wheel 41 is a circular disc having a preferred diameter 61 of 3.75 inches (9.525 cm). The chopping wheel 41 is characterized by a plurality of slots 62–71 along its outer periphery which are equally, angularly spaced with respect to the axis of rotation 73 of the chopping wheel 41. The slots 62–71 are open on one side along the periphery of the chopping wheel 41. The sides of the slots 62–71 are parallel and are each separated by a cord 72 of preferably 0.5 inches (1.270 cm). The bases of the slots 62–71 are segments of an inner circle which has a preferred diameter 92 of 2.50 inches (6.350 cm). The slots 62–71 are separated by a plurality of teeth 81–90 which are also equally, angularly spaced with respect to the axis of rotation 73 of the chopping wheel 41. The sides of the teeth 81–90 are common to the sides of the slots 72–71 respectively. The outer edge of the teeth 81–90 form segments of the periphery of the chopping wheel 41.

As illustrated in FIG. 2, the reference line 93 is a radial line projecting from the axis of rotation 73 through the center of the slot 66. The reference line 94 is a radial line projecting from the axis of rotation 73 through the center of the tooth 86. The reference line 95 is a radial line projecting from the axis of rotation 73 through the center of the tooth 85. The angle 97 between the reference line 93 and the reference line 94 is 18° (0.314 rad). The angle 98 between the reference line 93 and the reference line 95 is also 18° (0.314 rad). This relationship is maintained around the entire circumference of the chopping wheel 41 so as to provide a plurality of equally, angularly spaced openings through which the reference molecular beam and the sample molecular beam are alternately passed.

Provision is made for adjusting the chopping wheel 41 into or out of the path of the reference molecular beam and the sample molecular beam. If the chopping wheel 41 is moved to a position such that the reference beam and the sample beam are chopped by a peripheral portion of the chopping wheel 41, then each beam will be blocked for a longer period than each beam will be on. In like manner if the chopping wheel 41 is moved to a position such that the reference beam and sample beam are located near the base of the slots 62-71, then the reference beam and sample beam will be on for a longer period then they will be off. If the chopping wheel 41 is moved to a position such that the reference beam and sample beam are at the center of the slots 62-71, then the reference beam and sample beam will be on for substantially the same time as they are off. The use of a chopping wheel having a plurality of slots which have parallel sides and which are equally angularly spaced with respect to the axis of rotation of the chopping wheel 41 allows changing the relative amounts of beam on time with respect to beam off time.

Figure 3:
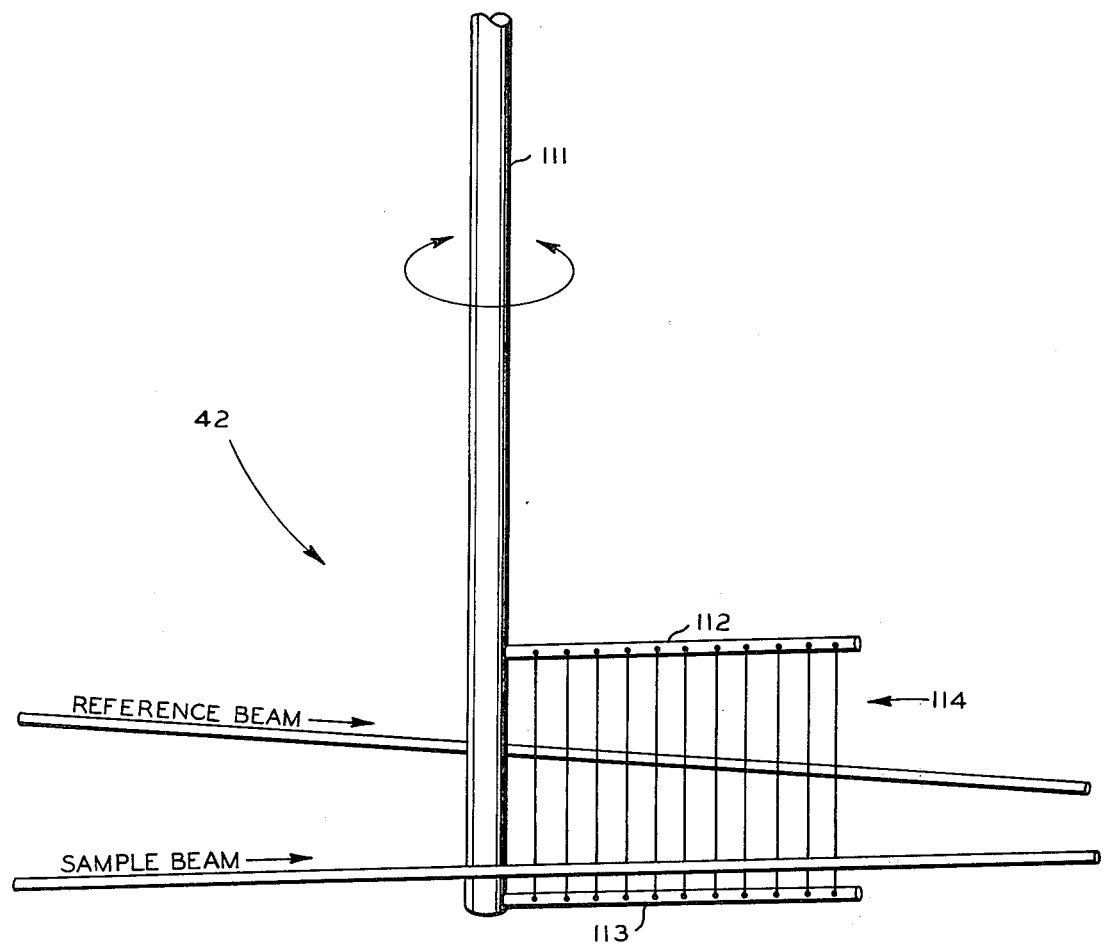
FIG. 3 is an illustration of the beam balance filter illustrated in FIG. 1.

The beam balance filter 42, illustrated in FIG. 1, is more fully illustrated in FIG. 3. The beam balance filter 42 consists of a rod 111 to which two rods 112 and 113 are attached in such a manner that each of rods 112 and 113 form a right angle with rod 111. The filter grid 114 is formed by a plurality of parallel wires which are attached to both rod 112 and rod 113.

The beam balance filter is utilized to make the intensity of the sample beam and the reference beam, as seen by the mass spectrometer, equal. To accomplish this, shaft 111 is rotated so as to place the filter grid 114 either in the reference beam or the sample beam. The filter grid 114 blocks a portion of either the reference beam or the sample beam and in this manner the intensity of the reference beam and sample beam, as seen by the mass spectrometer, may be set equal. The beam balance filter 42 is extremely useful in calibrating the system illustrated in FIG. 1 so as to allow accurate measurement of the infinite dilution activity coefficients.

Figure 4:
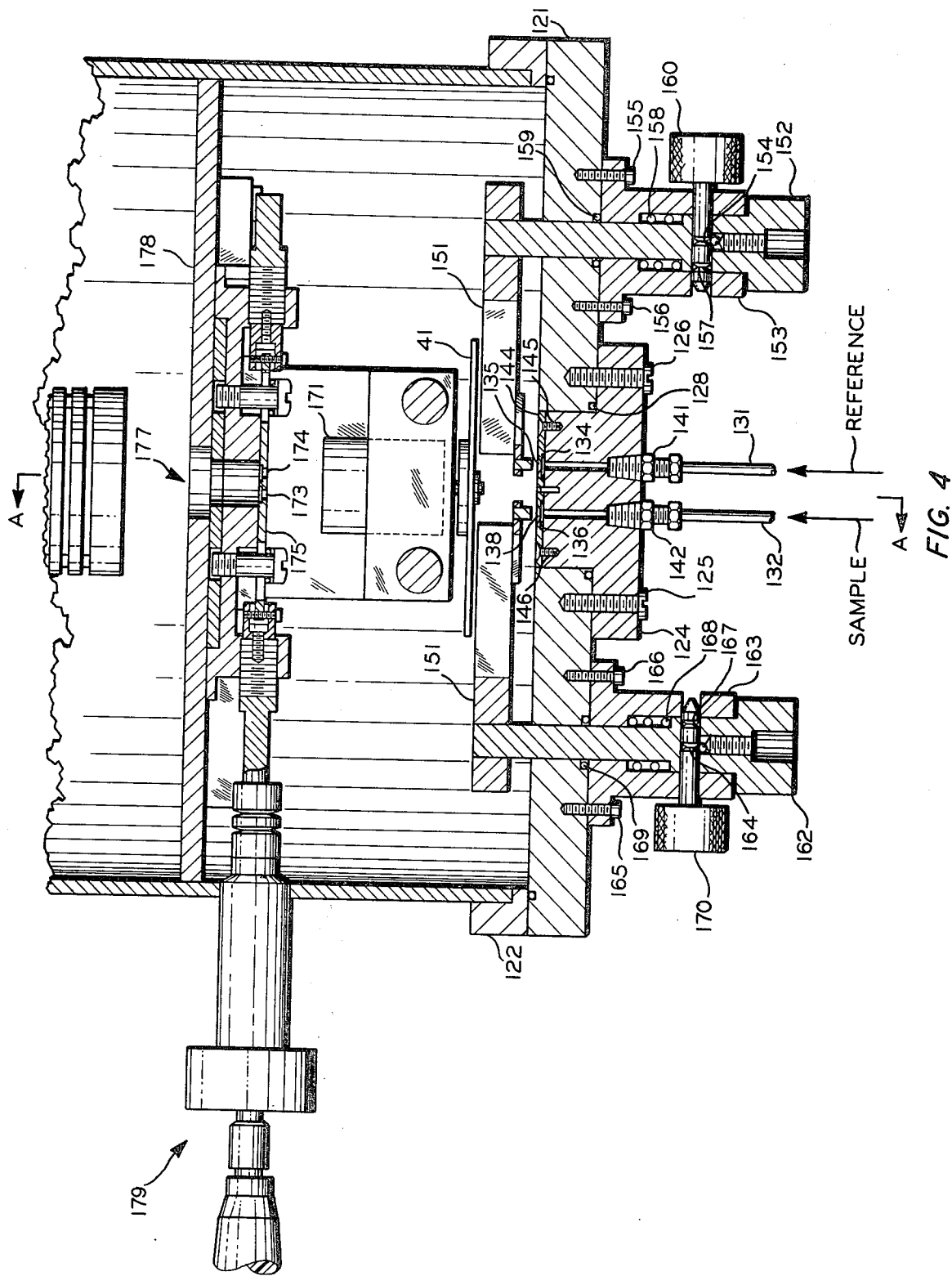
FIG. 4 is a top view in cross section of the apparatus associated with the chopping wheel illustrated in FIG. 1.
Figure 5:
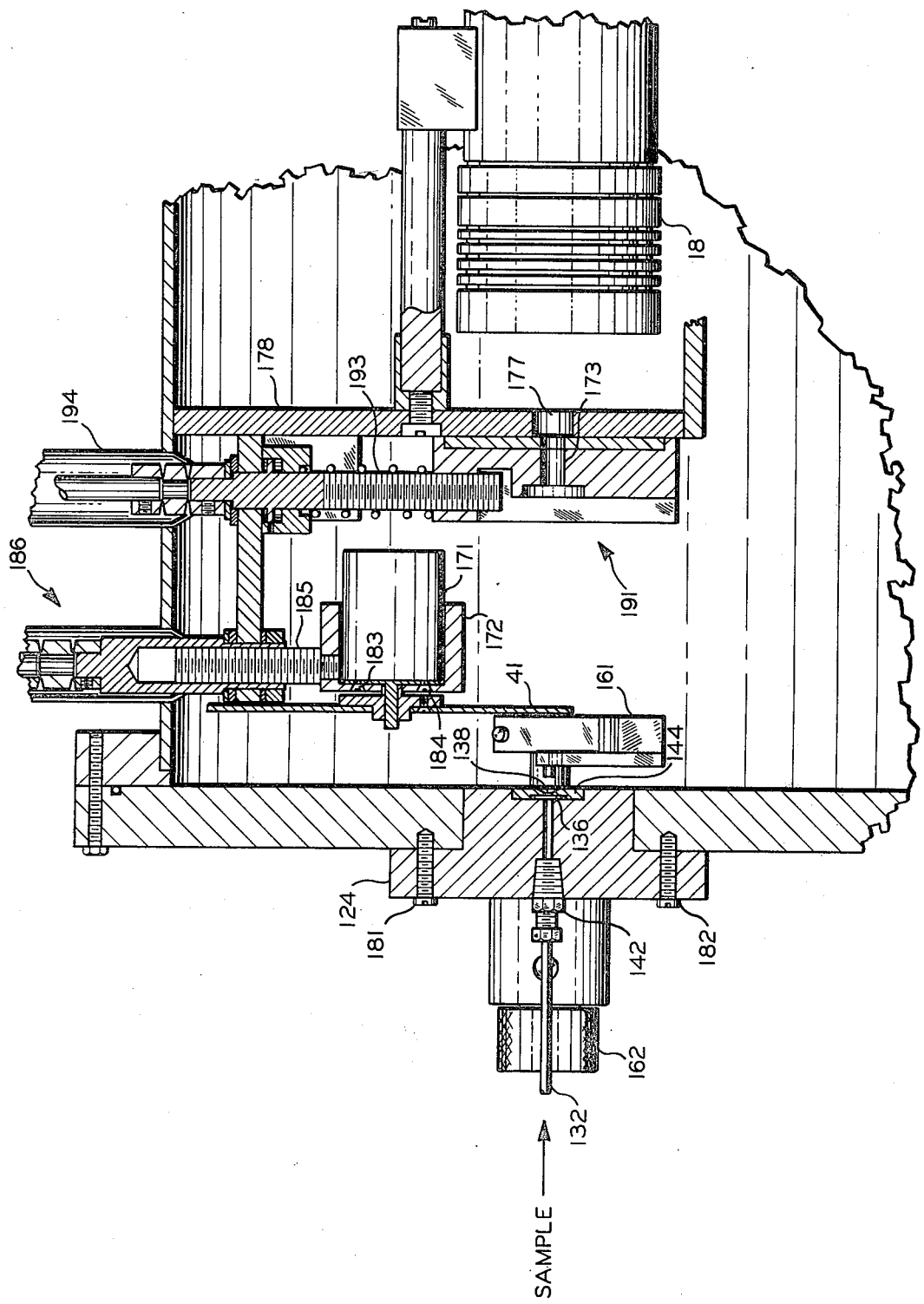
FIG. 5 is a side view in cross section of the apparatus associated with the chopping wheel illustrated in FIG. 1.

The apparatus associated with the chopping wheel 41, illustrated in FIG. 1, is illustrated in the cross-sectional views of FIGS. 4 and 5. Referring now to FIG. 4, the inlet flange 121 and the cylindrical plate 122 form the primary structural support for the chopping wheel mechanism. The plate 124 is connected to the inlet flange 121 by bolts 125 and 126. The O-ring 128 is utilized to seal the plate 124 to the inlet flange 121.

The reference molecular beam passes through means 131, the Buckbee-Meer's aperture 134 and the aperture 135. The sample molecular beam passes through conduit means 132, the Buckbee-Meer's aperture 136 and the aperture 138. Conduit means 131 and 132 are operably connected to the plate 124 by couplings 141 and 142 respectively. The Buckbee-Meer's apertures 134 and 136 are held in place by the plate 144 in which the apertures 135 and 138 are formed. The plate 144 is connected to the plate 124 by screws 145 and 146.

The flag arm 151 is utilized to block the reference molecular beam if desired. The flag arm 151 is moved by rotating the flag arm control knob 152 which is operably connected to the flag arm 151. The flag arm control knob 152 is supported by the cylindrical plate 153 which is connected to the inlet flange 121 by bolts 155 and 156. A spring 158 surrounds a portion of the flag arm control knob 152 and is enclosed by the cylindrical plate 153. An O-ring 159 is utilized to seal the cylindrical plate 153 to the inlet flange 121.

The flag arm 161 is utilized to block the sample molecular beam if desired. The flag arm 161 is moved by rotating the flag arm control knob 162 which is operably connected to the flag arm 161. The flag arm control knob 162 is supported by the cylindrical plate 163 which is connected to the inlet flange 121 by bolts 165 and 166. A spring 168 surrounds a portion of the flag arm control knob 162 and is enclosed by the cylindrical plate 163. An O-ring 169 is utilized to seal the cylindrical plate 163 to the inlet flange 121.

The flag arm 151 is normally in a position which will not block the reference molecular beam. The flag arm 151 is locked in this position by the locking pin 160. When it is desired to rotate the flag arm 151 into the path of the reference molecular beam, the locking pin 160 is pulled out to a position in which the groove 157 is substantially in the position occupied by the groove 154 when the locking pin 160 is in a locked position. After the locking pin 160 is pulled out, the flag arm control knob 152 can be utilized to rotate the flag arm 151 into the path of the reference molecular beam.

The flag arm 161 is normally in a position which will not block the sample molecular beam. The flag arm 161 is locked in this position by the locking pin 170. When it is desired to rotate the flag arm 161 into the path of the sample molecular beam, the locking pin 170 is pulled out to a position in which the groove 167 is substantially in the position occupied by the groove 164 when the locking pin 170 is in a locked position. After the locking pin 170 is pulled out, the flag arm control knob 162 can be utilized to rotate the flag arm 161 into the path of the sample molecular beam.

The chopping wheel 41 is operably mounted on the drive shaft of the motor 171. The motor 171 is supported by motor bracket 172. Two guide posts 180 and 175 are utilized to position the motor bracket 172.

Two aperatures 173 and 174 are located in plate 175. The reference molecular beam and the sample molecular beam pass through the apertures 174 and 173 respectively and then through the opening 177 in the rear flange 178 into the ionizer of the mass spectrometer 18, illustrated in FIG. 1. The micrometer assembly 179 may be utilized to move the apertures 173 and 174 and thus provide a horizontal adjustment for the position of the apertures 173 and 174.

Referring now to FIG. 5, the sample molecular beam passes through conduit means 132, the Buckbee-Meer's aperture 136 and the aperture 138. Conduit means 132 is operably connected to the plate 124 by coupling 142. The plate 124 is operably connected to the front flange 121 by bolts 181 and 182. The Buckbee-Meer's aperture 136 is held in place by the plate 144 in which the aperture 138 is formed.

The flag arm 161 is operably connected to the flag arm control knob 162 as is more fully shown in FIG. 4. The flag arm 161 may be rotated into or out of the path of the sample molecular beam by manipulating the flag arm control knob 162.

The chopping wheel 41 is operably connected to the drive shaft of the motor 171. The motor is supported by the support bracket 172. The motor 171 is connected to the support bracket 172 by screws 183 and 184. The support bracket 172 is connected to the chopper screw 185. The micrometer assembly 186, together with the chopper screw 185, provide for vertical adjustment of the position of the chopping wheel 41.

The sample molecular beam passes through the aperture 173 which is located in the plate assembly 191 and then passes through the opening 177 in the rear flange plate 178 into the ionizer of the mass spectrometer 18. The plate assembly 191 is operably connected to the aperture vertical adjustment screw 193. The micrometer assembly 194, in combination with the aperture vertical adjustment screw 193, provides a means for adjusting the vertical position of the aperture 173.

Referring now to both FIGS. 4 and 5, the position of the chopping wheel 41 is first adjusted in such a manner that the two molecular beams are passed alternatively to the mass spectrometer 18. This is accomplished by the operator using micrometer assembly 186. The position of the apertures 173 and 174 is adjusted horizontally by the operators using micrometer 179. The vertical position of the apertures 173 and 174 is adjusted by the operator using the micrometer assembly 194. Once these adjustments have been made, the two molecular beams may be passed alternately through the chopping wheel assembly shown in FIGS. 4 and 5 and thus into the mass spectrometer 18.

While the invention has been described in terms of the presently preferred embodiment, reasonable variations and modifications are possible by those skilled in the art within the scope of the described invention and the appended claims.

That which is claimed is:

1. Apparatus comprising:
   a mass spectrometer having an inlet;
   means for directing a first molecular beam toward the inlet of said mass spectrometer;
   means for directing a second molecular beam toward the inlet of said mass spectrometer, said first molecular beam originating from a first source, said second molecular beam originating from a second source which is substantially adjacent said first source, said first molecular beam and said second molecular beam converging at the inlet of said mass spectrometer;
   a circular disc positioned in the path of said first molecular beam and in the path of said second molecular beam in such a manner that the axis of rotation of said circular disc extends generally in the direction of movement of said first molecular beam and said second molecular beam, said circular disc having a plurality of equally angularly spaced openings therein with respect to the axis of rotation of said circular disc, two of the sides of each of said equally, angularly spaced openings which extend towards the central portion of said circular disc being substantially parallel, said circular disc being aligned so as to alternately pass said first molecular beam and said second molecular beam through said plurality of equally angularly spaced openings to the inlet of said mass spectrometer;
   means for rotating said circular disc; and
   means for moving said circular disc transversely with respect to said first molecular beam and said second molecular beam so as to vary the position of said first molecular beam and second molecular beam in said plurality of equally angularly spaced openings, said first molecular beam and said second molecular beam being transmitted to the inlet of said mass spectrometer for a longer period of time than the transmission of said first molecular beam and said second molecular beam to the inlet of said mass spectrometer is blocked by the portion of said circular disc between said plurality of equally angularly spaced openings if said first molecular beam and said second molecular beam are passed through each one of said plurality of equally angularly spaced openings at a position near the axis of rotation of said circular disc, said first molecular beam and said second molecular beam being transmitted to the inlet of said mass spectrometer for a shorter period of time than the transmission of said first molecular beam and said second molecular beam to the inlet of said mass spectrometer is blocked by the portion of said circular disc between said plurality of equally angularly spaced openings if said first molecular beam and said second molecular beam are passed through each one of said plurality of equally angularly spaced openings at a position near the periphery of said circular disc.

2. Apparatus in accordance with claim 1 wherein said plurality of equally angularly spaced openings are open on one side along the periphery of said disc.

3. Apparatus in accordance with claim 2 wherein the bases of said plurality of equally angularly spaced openings form segments of an inner circle inside the periphery of said disc.

4. Apparatus in accordance with claim 3 wherein said plurality of equally angularly spaced openings are separated by a plurality of equally angularly spaced teeth, the sides of said plurality of equally angularly spaced teeth being common with the sides of respective ones of said plurality of equally angularly spaced openings, the outer edge of said teeth forming segments of the periphery of said disc.

5. Apparatus in accordance with claim 4 wherein the angle between a radial line extending from the axis of rotation of said disc through a first one of said plurality of equally, angularly spaced opening and a radial line extending from the axis of rotation of said chopping wheel through the center of a first one of said plurality of equally, angularly spaced teeth which is adjacent to said first one of said plurality of equally, angularly spaced openings is 18° (0.314 rad).

* * * * *